Figure 1:
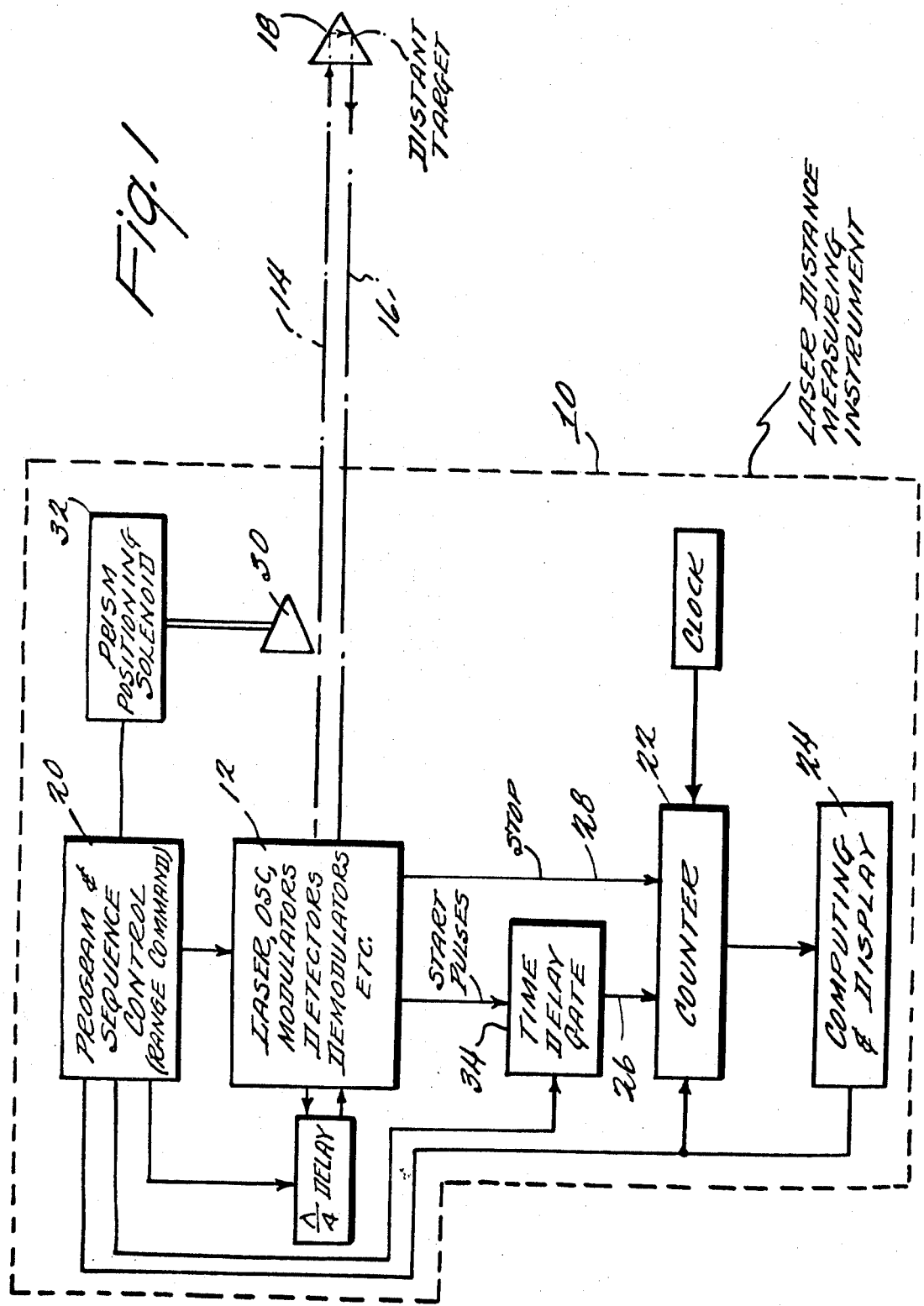

United States Patent [19]
DeWitt, Jr.

[11] 3,740,141
[45] June 19, 1973

[54] TIMING AND MEASURING METHODS AND MEANS FOR LASER DISTANCE MEASUREMENTS

[75] Inventor: John H. DeWitt, Jr., Nashville, Tenn.

[73] Assignee: Laser Systems & Electronics, Inc., Tullohoma, Tenn.

[22] Filed: Sept. 20, 1971

[21] Appl. No.: 181,756

[52] U.S. Cl. .................................. 356/5, 343/12
[51] Int. Cl. .............................................. G01c 3/08
[58] Field of Search .................. 356/5, 128; 343/12

[56] References Cited
UNITED STATES PATENTS
3,522,992  8/1970  Jaffe ...................................... 356/5

Primary Examiner—Benjamin A. Borchelt
Assistant Examiner—S. C. Buczinski
Attorney—John W. Malley, G. Lloyd Knight, Carl G. Lane et al

[57] ABSTRACT

An improved laser distance measuring apparatus of the type that automatically calculates distance to a remote reflection target based upon a measured phase difference between a modulated transmitted laser beam and a reflected return beam from the remote target. The improved apparatus incorporates means for insuring that phase measurements for the return beam are made only when the amplitude of the demodulated return signal is within predetermined limits thereby insuring a desired degree of accuracy for the resulting phase measurement. Furthermore, rather than performing an absolute phase difference measurement, better overall accuracy is obtained by calculating a relative phase difference corresponding to the difference between external and internal reflected beam path distances. Since reflected laser beam components usually exhibit rather severe scintillations due to rapidly changing atmospheric conditions over the beam path length, means are disclosed for insuring that successive phase difference measurements are taken from different packets or bunches of reflections thus insuring that an average of several such measurements is not taken from only a single packet and hence insuring that the resultant average measurement more accurately represents the true distance to the remote target site. In addition, added electrical phase shift means are switched into operation for substantially one-half of the predetermined number of distance measurements on the most critical phase measurements to substantially cancel nonlinearities inherent in such measurements due to corresponding nonlinearities in the demodulated return signals having a significant harmonic content therein. Furthermore, when the detectable phase difference measurement is less than a predetermined limit, there is a possibility of phase "jitter" causing a counter "stop" signal to occur before the counter "start" signal thereby resulting in erratic counter operation and correspondingly erroneous phase measurement. Accordingly, means are provided for detecting such an "overlap" condition and for automatically accepting the second instead of the first available "stop" counter signal whenever such overlap conditions occur thereby introducing an additional 180° phase difference which is then compensated by complementing the counter in compensation for this fixed added phase difference. The net result is stable counter operation and the elimination of completely erroneous phase difference measurements due to phase jitter.

4 Claims, 4 Drawing Figures

TIMING AND MEASURING METHODS AND MEANS FOR LASER DISTANCE MEASUREMENTS

This invention generally relates to improvements for laser distance measuring apparatus of the type disclosed in commonly assigned, co-pending application Ser. No. 18,101 filed Mar. 10, 1970.

The basic apparatus in which these improvements are utilized are adapted for accurately measuring and digitally displaying the distance from a local measuring point where the apparatus is located to another remote reflection point. A modulated laser beam from the local point (modulated at a known frequency) is directed to the remote target point and the reflection therefrom is detected and demodulated with phase difference between the transmitted and received information representing a measure of the round-trip distance to the remote target point. Preferably, the laser beam is modulated at a relatively high frequency by mixing a reference radio frequency (RF) signal with a reference intermediate frequency (IF) signal and the return detected signal from the return reflected beam is again mixed with the same reference RF signal thus converting it back to the same intermediate frequency. The phase difference measurements are then made at the lower intermediate frequency where measurement is more convenient and accurate.

Clock pulses are counted during a delay period between common phase points on the transmitted IF signals and the return reflected IF signals to obtain a digital count in a counter which is proportional to the phase shift between these two signals. The contents of the counter after such a measuring interval is then acted upon by appropriate digital circuitry to compute a corresponding one way distance to the remote target site. In addition, special provisions may be made for utilizing a plurality of different radio frequencies having frequency differences with a fundamental frequency corresponding to half-wave lengths at decade intervals of a basic unit of measurement (e.g. a meter) and then combining the plurality of differing phase measurement results to obtain an accurate total range measurement with increasingly significant digits of the overall range measurement being obtained from increasingly longer corresponding half-wave length differences.

In such an apparatus, the phase difference measurement may be obtained by starting to count clock pulses at a predetermined phase point in the transmitted IF signal corresponding to the modulation content of the transmitted laser beam and by stopping the counter operation when a similar phase point is detected on the return IF signal demodulated from the return reflected laser beam. However, when such a technique is used, the "start" signal is always present because the reference IF signal originates from within the instrument itself but the "stop" count signal is not always present since the reflected signal is subject to extreme scintillation due to atmospheric turbulence, etc. Thus, the counter may run on for several measurement cycles before actually being stopped to result in a totally erroneous phase difference indication.

Therefore, it is preferable that the "start" signal be derived from the return IF signal and the "stop" signal derived from the internally generated transmitted IF signal. In this matter, the stop signal is always present and thus the accuracy of the resultant phase difference measurement is considerably increased in reliability and the electronic switching components will have lower duty cycles to result in longer life as should be apparent to those in the art.

In any event, whether the start signal or the stop signal pulse is obtained from the noisy return waveform, the noisy return waveform represents or includes amplitude modulation due to atmospheric turbulence and detector shot noise such that the start and/or stop signal pulses generated for low amplitude and high amplitude signals are in error with respect to the stop and/or start signal pulse obtained from the reference or transmitted IF signal.

With this invention, the start and/or stop signal pulses generated from the return reflected signal are only generated when the demodulated return signal is within predetermined minimum and maximum limits thus insuring that the start and/or stop signal pulses are within predetermined limits of desired accuracy.

Furthermore, in such a laser distance measuring apparatus, absolute phase measurements for the phase difference are not ordinarily made directly but rather, means are provided for making the phase difference measurements relative to an internal light path within the instrument itself. Thus, the laser is normally pointed to the distant reflection target and an internal counter counts in one sense (e.g. down) for the external measurement interval. On completion of that external measurement interval, a rotary solenoid (or other positioning means) positions a prism into the light beam path to direct it onto the photo-detector directly through an internally reflected light beam path for an internal reference measurement. The counter then counts in the other sense (e.g. up) during the internal measurement interval so that the net difference remaining in the counter at the end of both these counting intervals is the relative phase difference corresponding to the difference between the external beam path and the internal beam path distances.

In the exemplary embodiment, this procedure of obtaining a relative phase difference measurement is followed on four different frequencies to obtain increasingly significant digits for the overall distance measurement as previously discussed and as should be apparent to those in the art especially in view of the aforementioned commonly assigned application. The procedure is controlled from a logic means or range command module which coordinates a plurality of ranging measurements as each of the four different frequencies and produces averages of the plurality of measurements to obtain more accurate significant figures for the overall ranging measurement.

However, since in any event, the phase difference measurements are made by counting clock pulses between a return IF signal generated start pulse and a transmitted IF stop pulse generated from an internally generated IF reference, an ambiguous condition exists whenever the start and stop pulses are so close together (i.e. "overlapped") that they can occasionally interchange due to phase jitter on the return externally reflected signal. Although such jitter is normally less than a percent of the total IF period, the condition does exist once for each of the four frequencies for each half-wavelength of distance. Since the initial stop pulse is generated from a symmetrical reference square pulse, a second stop pulse is always available from the other transition point but 180° later. Thus, according to this invention, whenever the start and stop signals are separated by less than a predetermined difference, this second stop pulse is used instead of the first and a predetermined number (e.g. 5,000) is automatically added to the counter to compensate for the additional phase shift introduced by using this second stop pulse instead of the first.

If the start/stop overlap condition occurs for the internally reflected return signal, the phase shift and additional count procedure is not possible since the counter is already loaded with the external measurements. Accordingly, according to this invention, the internal overlap condition is merely acknowledged and the resultant erroneous measurement is not displayed. Instead, the stop pulse for the particular frequency or frequencies that experience the overlap is shifted 180° by a flip-flop and the entire distance measurement (i.e. cycling through all frequencies) is redone.

In the exemplary embodiment of the apparatus, the accuracy and stability of distance measurements is improved by measuring the phase difference for 100 IF periods on a first fundamental frequency where the greatest accuracy is required for obtaining several of the least significant digits of the overall distance measurement. In addition, 10 IF periods of phase difference measurements are used on each of the three other frequencies with the average in each case being the resultant phase difference utilized for making the final distance calculation and obtaining the higher significant digits of the overall distance measurement.

Since the exemplary embodiment utilizes a down conversion process in the demodulation (i.e. the RF is converted to IF) of the information on the return reflected beam, the down conversion process generates various harmonics that cause the IF signal to be non-symmetrical. In turn, this nonsymmetry causes a non-linear error in the distance measurement which deviation is a quarter wavelength sine wave as a function of distance. Therefore, at least on the fundamental frequencies (i.e. the frequency requiring the highest accuracy for obtaining the least significant digits of the overall distance measurement), the phase difference measurement on 50 (i.e. one-half of the total plurality of measurements) IF periods is made with an additional quarter wavelength length of electrical cable in the electrical path thus inserting a 90° phase shift on these 50 IF periods. In addition, on the other 50 IF periods no such additional phase shift is introduced. Thus, when all the 100 IF period measurements are averaged, the nonlinear error is substantially cancelled out of such a resultant measurement. Accordingly, a start/stop pulse overlap condition arising during an external beam path measurement interval causes the external measurement to be remade with a 180° phase shift in the start pulse and with an additional compensating count being added to the counter for that single frequency only. However, such a start/stop pulse overlap condition for the internal beam path measurement interval will cause the entire sequence of all four frequencies to be automatically rerun with a 180° digital phase shift introduced in this later series of measurements as was determined as being necessary on the initial run.

Furthermore, in this invention, a timing delay of a predetermined amount (e.g. 10 milliseconds) is caused to occur between starting pulses accepted by the count circuitry in an attempt to average the effect of atmospheric scintillations. That is, under usual atmospheric conditions existing over the laser beam path length, the returned or reflected signal is subject to severe scintillation such that the return signal often arrives in bunches or packets of from 5 to 20 IF cycles. By accepting start signals to the count circuitry that are separated, at least by a predetermined minimum time, it is insured that the start signals are originating from different bunches or packets of return signal cycles such that each of a plurality of successive measurements are made from different packets, each of which are caused by different atmospheric conditions or indices of refraction over the path lengths. Accordingly, by averaging such a plurality of measurements from different packets or bunches, the atmospheric scintillations are averaged out to result in a more reliable and accurate overall distance measurement.

Figure 2:
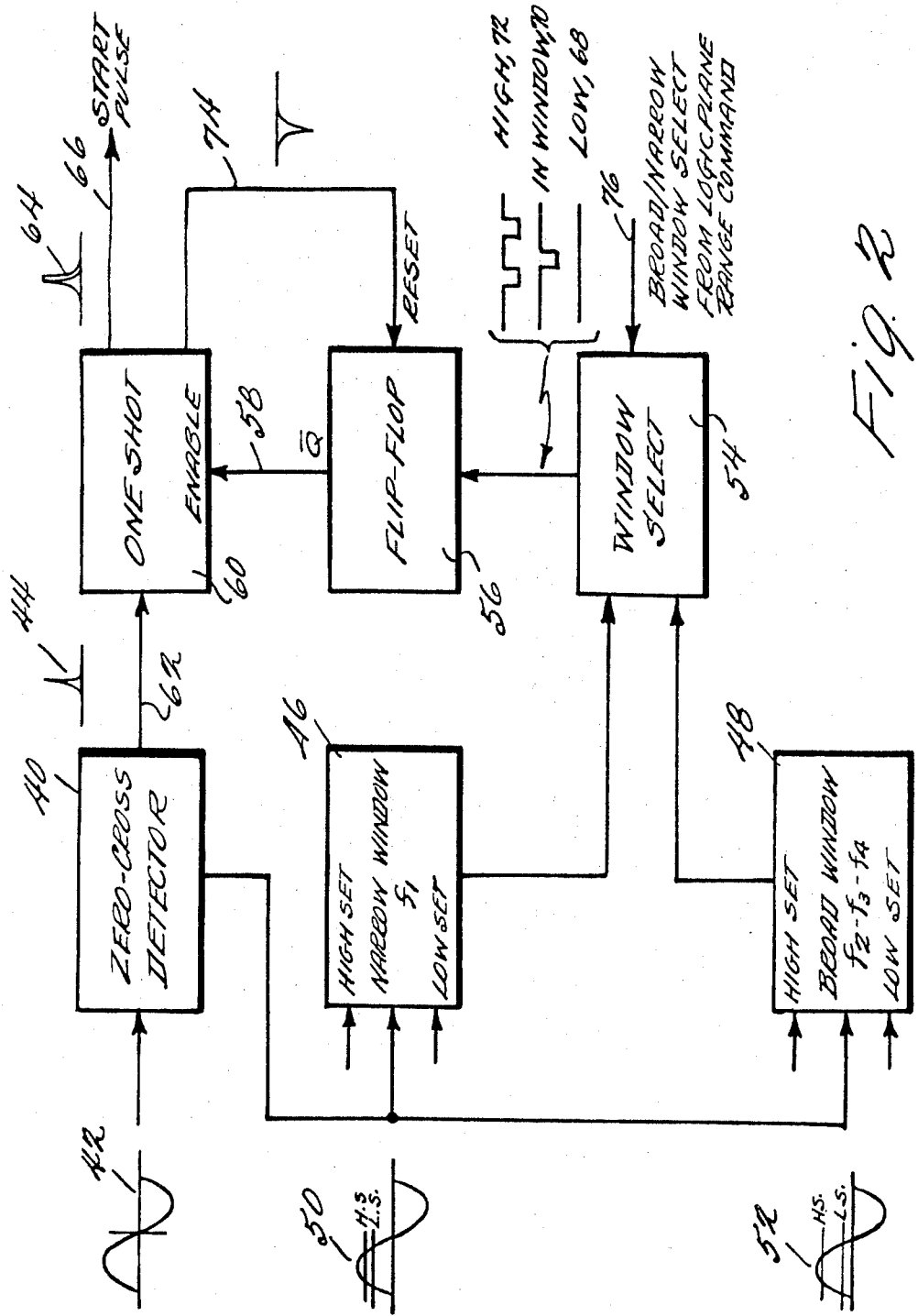
Figure 3:
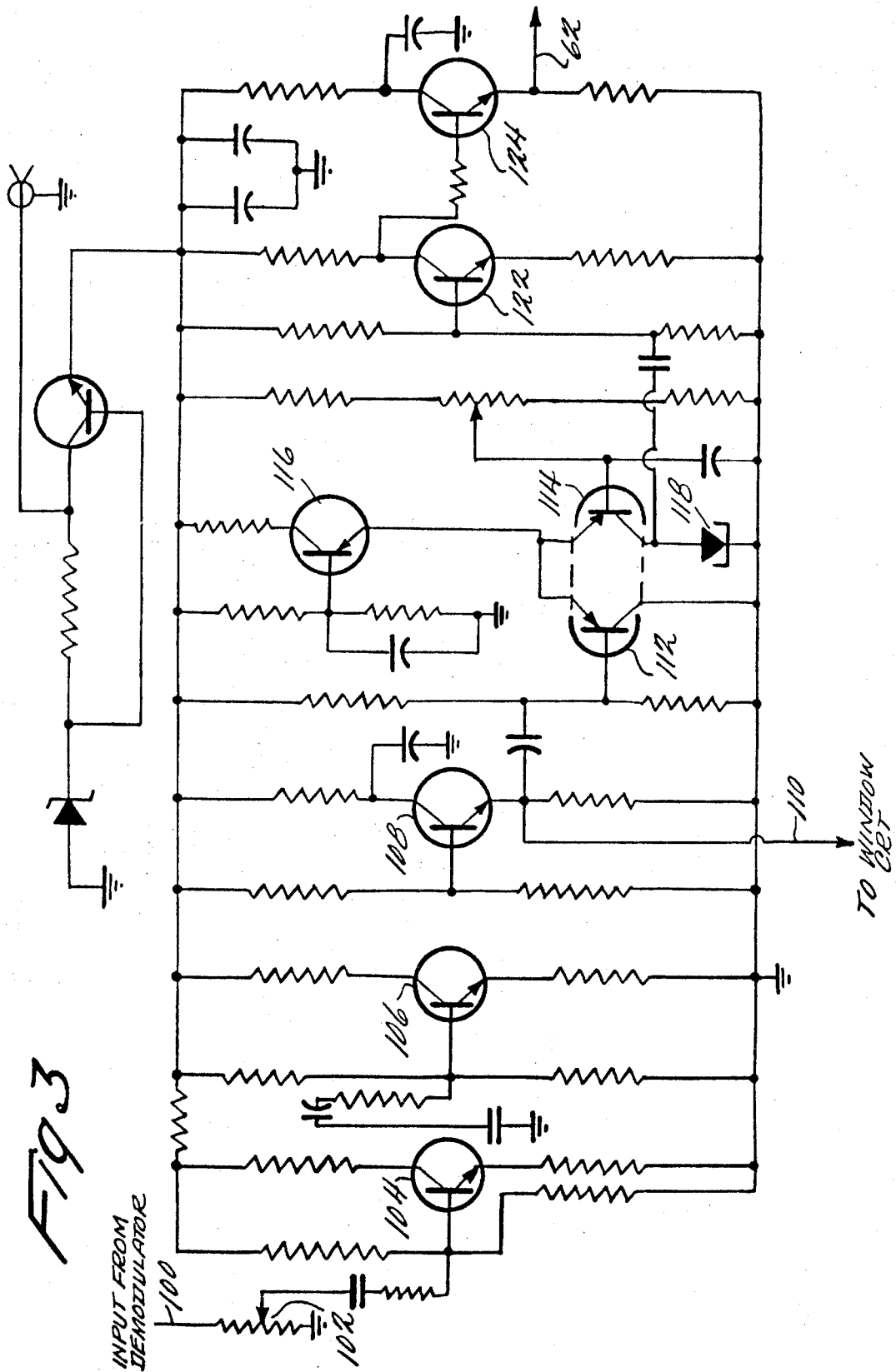
Figure 4:
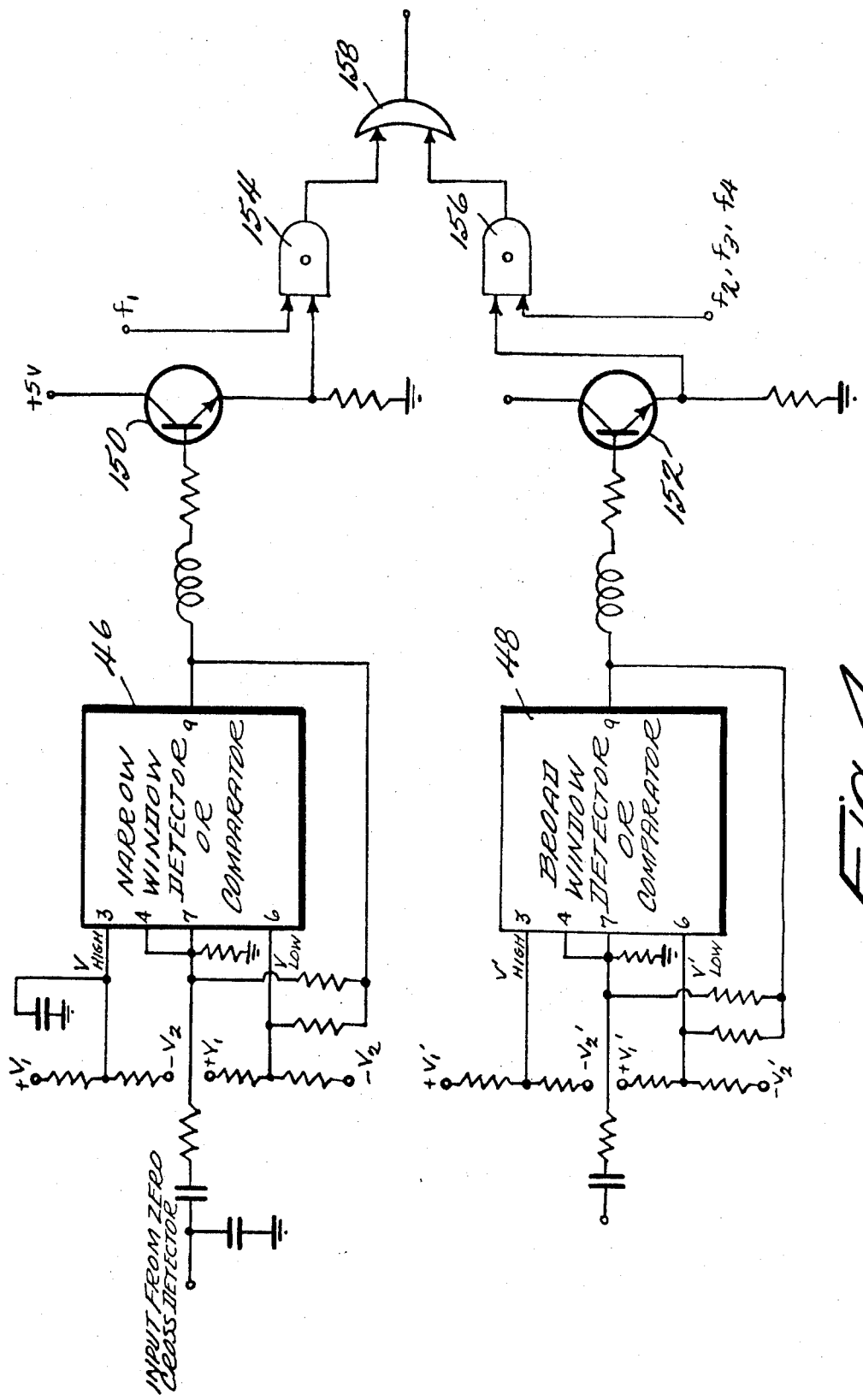

Other objects and advantages of this invention as well as a more complete understanding thereof may be obtained from the following more detailed description and the accompanying drawings, of which:

FIG. 1 is a schematic block diagram of the overall improved laser distance measuring instrument of this invention, FIG. 2 is a block diagram of an improved detecting means for providing a return electrical signal such as a start pulse for counting circuitry, FIG. 3 is an electrical schematic diagram of an exemplary embodiment for a zero cross-detector shown in block form in FIG. 2, and FIG. 4 is an electrical schematic diagram of an exemplary embodiment for the window detectors and selection elements shown in block form at FIG. 2.

Referring to FIG. 1, the general overall apparatus for measuring distance via a reflected laser beam is illustrated including the improvements of this invention. First of all, the basic operation of the apparatus even without the improvements of this invention will be briefly described to further the appreciation for the advantages accruing from the improvements to be later described.

As is now well known, a source of coherent light such as a laser may be used to provide a laser beam for efficient light transmission over relatively long distances even though the actual power of the laser source may be quite low. Furthermore, laser interferometers and/or distance measuring equipment utilizing modulated laser beams are already known in the art. Briefly, such instruments usually amplitude modulate the laser beam (i.e. by utilizing a Kerr cell) at a known frequency. Of course, unless the round trip distance from the transmitting site to a distance reflecting site and back to the transmitting site is an exact multiple of wavelengths, there will be a phase difference between the information modulated onto the transmitted beam and that demodulated frog the return beam. Furthermore, if the round trip distance is less than a whole wavelength, the distance may be conveniently measured by measuring the phase difference between the transmitted and returned signals and then computing the distance using the known wavelengths in the transmitting medium (e.g. air).

However, when such instruments are used to measure relatively long distances such as in the surveying arts, it either becomes impractical to use long enough wavelengths or the phase difference cannot be measured accurately enough to provide the desired degree of accuracy in the resulting overall distance measurement. Accordingly, a shorter wavelength is usually used which means there is an unknown integral number of wavelengths included in the round trip distance representing an ambiguity in the total distance measurement.

In the exemplary embodiment of this invention, such ambiguities are eliminated by using a first frequency $F_1$ to make a very accurate determination of the least significant digits of an overall distance measurement and then using successively different frequencies $F_2$, $F_3$ and $F_4$ to obtain increasingly significant digits of the overall distance measurement thus eliminating the ambiguity.

Accordingly, a portion of the apparatus or laser distance measuring instrument 10 includes an element such as 12 comprising a laser source, oscillators, modulators, detectors, demodulators, and other such equipment as will be apparent to those in the art as being necessary for modulating (perhaps including up and down conversion between intermediate frequencies and a final transmitted RF frequency) the transmitted laser beam and for demodulating the returned reflected beam from a distant target 18. Since the measurements at any given frequency are subject to some statistical fluctuation (due to causes such as atmospheric turbulence which varies over the length of the beam path, phototube detector shot noise, inaccuracies in phase different measurements, etc.), it is preferable to make a plurality of different phase difference measurements on each frequency and to use an average of these different measurements for the actual distance calculations in an attempt to average out such statistical fluctuations and to make the final indicated distance more reliable and accurate in the process.

Of course, making such a plurality of measurements on each of several different frequencies and averaging the results to obtain successively increasing significant digits of a total overall measurement requires programming and sequence control from a range command module 20 which has been programmed to appropriately control the modulating and demodulating processes in combination with the operation of digital counters for counting clock pulses used to measure phase differences and to compute and display the final measured distance. Accordingly, the range command module 20 is connected to the module 12 as well as to the counter 22 and the computing and display means 24.

The phase difference measurements for each measurement at any given frequency is obtained by counting clock pulses in a counter 22 for the time interval between a "start" pulse on line 26 and a "stop" pulse on line 28. The start and stop pulses, of course, correspond to similar phase points on the transmitted and returned IF signals. For instance, the start signal on line 26 could correspond to a negative going zero crossing of the transmitted IF signal while the stop signal could correspond to the next subsequent negative going zero crossing on the return IF signal. However, if such an arrangement were used, due to the scintillations on the return beam, it is quite possible that the stop signal would not be received at the appropriate time from the very next subsequent IF cycle but rather only from a later return IF cycle thus causing the actual stop signal to be delayed beyond the point representing the true or actual distance between the instrument and the distant target. Accordingly, since the transmitted IF signal is always present (i.e. it is internally generated in the instrument), it is preferred that the start signal on line 26 be obtained from the return IF signal while the stop signal on line 28 be obtained from the transmitted IF signal.

In any event, since the start and stop pulses represent common phase points in the transmitted and return IF signals, after any given measurement interval, the contents of counter 22 will represent the phase difference between these two signals and hence a measurement of the distance between the instrument 10 and the distant target 18. Of course, the ambiguity of an unknown integral number of wavelengths still remains however, the counter contents will represent the "incremental distance" or the "partial" wavelength included in the round trip distance. As mentioned before, a plurality of such counting or measuring intervals at any given frequency are obtained and utilized by the computing means in element 24 to compute an average phase difference for that given frequency which is then used in computing the incremental distances and the corresponding digits of the total measured distance.

While ideally this type of a phase difference measurement could be made in an absolute manner with the contents of the counter 22 being an absolute indication of the phase difference, it is preferable for the desired degree of accuracy, that the phase difference measurement be made in a relative fashion rather than an absolute fashion. That is, it is preferred that counter 22 be an up-down counter which is counted in a first direction (e.g. down) during a measurement for which the beam is externally reflected from distant target 18 and then counted in the opposite sense (e.g. up) for a subsequent measurement interval utilizing an internally reflected beam path from a prism 30 which is positioned in the path of transmitted beam 14 by a positioning means such as a rotary solenoid 32 at the proper time under control of the range command module 20. Thus, for any given frequency, the phase difference measurement utilized in the final distance computation is obtained as a result of two measurement intervals. A first measurement interval during which the counter is counted in a first sense occurs while the transmitted beam 14 is being reflected from a distant target, 18. Thereafter, the rotary solenoid 32 is caused to position the reflecting prism 30 into the path of the transmitted beam 14 such that the total beam path distance is comparatively short and completely internal to the instrument itself. Then, a second measurement interval is used for this internally reflected beam path during which the counter 22 is counted in the opposite sense with the resultant counter contents representing the difference between the phase measurement for the externally reflected and the internally reflected beam path. It is this relative measurement that is then utilized by the computing and display element 24 and of course it is a plurality of such relative measurements at each individual frequency which are then averaged to minimize statistical fluctuations before actually computing the total measured distance.

Typically, a relatively greater number of measurements is made at the fundamental frequency since greater accuracy is desired on this fundamental frequency for determining the least significant digits of the total measured distance. In the exemplary and preferred embodiment, the counter 22 is counted down for 100 measurement intervals utilizing the externally reflected beam path and then counted up for 100 measurement intervals utilizing the internally reflected beam path. The total counter contents then represents 100 times the average relative phase difference measurement. Thereafter, each of the other frequencies $F_2$, $F_3$, and $F_4$ are utilized to obtain successively higher significant digits of the overall distance measurements. Here, the counter 22 is counted down for 10 measurement intervals over the externally reflected beam path and then counted up for 10 measurement intervals utilizing the internally reflected beam path whereby the resultant counter contents represents 10 times the average relative phase difference measurement as should now be apparent.

Those in the art will appreciate that laser beams transmitted over significant distances under normal atmospheric conditions will encounter variable indicies of refraction and absorption, etc. over the total transmission path such that after transmission over any such significant distance (which may include reflection from a distant target 18), the received beam (i.e. return beam in this instance) exhibits scintillations characteristic of the changing atmospheric conditions over the path length. Of course, such changing atmospheric conditions affecting the index of refraction will actually alter the path length. That is, the effective optical path length is different depending upon optical conditions and thus the phase difference measurements are varied likewise. Accordingly, to improve the reliability and accuracy of the resulting distance measurement, it is preferable that the phase difference measurement be made utilizing signals that come from different bunches or packets of return laser beam components.

That is, it has been observed in practice that, under extreme scintillation conditions, the return beam components along return path 16 from the distant target 18 arrive in packets representing 5 to 20 cycles of the IF frequency. Accordingly, if successive cycles of the IF frequencies are utilized to obtain the necessary phase difference measurements, it would be possible (on at least some frequency) to obtain all of the plurality of measurements from a single packet or bunch of such returned signals which probably represent only one of several possible optical path lengths caused by the changing atmospheric conditions. Thus, if such measurements were made utilizing only return IF signals from one such bunch or packet, the resultant distance measurement would be subject to erratic or erroneous results. However, if one relative phase measurement is taken from one of the packets and another is taken from the next packet and another from the next, etc., then the averaged results will represent measurements taken from a plurality of different packets and will tend to average out the changing atmospheric conditions over the beam path length thus enhancing the reliability and accuracy of the resulting distance computation. Accordingly, a time delay gate 34 is inserted in the instrument to pass start pulses with a predetermined minimum time between accepted (and hence passed) start pulses passed on line 26 to actuate counter 22. In the exemplary embodiment, an IF frequency of approximately 1.5 Khz is utilized and a time delay gate having a time constant of approximately 10 milliseconds has been discovered as providing an acceptable operation even under extreme scintillation conditions. Of course, the actual time constant can be varied but the 10 microseconds figure in the exemplary embodiment has been found sufficient to average most atmospheric scintillations.

Since the phase measurement is made by counting clock pulses between a return IF generated start pulse and a transmitted IF stop pulse, an ambiguous condition exists whenever the start and stop pulses are so close together that they can interchange due to phase jitter on the return signal which condition may often occur for the externally reflected beam path. Although such phase jitter is normally less than 1 percent of the total IF period, the condition does exist at least once for each of the four frequencies for each half wavelength of one-way distance to the target 18. Since the initial stop pulse is generated from an internally generated and hence stable symmetrical reference square wave, a second stop pulse is also available from the next subsequent transition point but 180° out of phase with the normally utilized first transition point. That is, the "start" normally occurs at a zero crossover point on the return signal with the "stop" pulse being generated at the next subsequent zero crossover of the transmitted signal. However, whenever the "start" and "stop" signals are separated by less than a predetermined difference, the second rather than the first transmitted IF zero crossover is utilized to actually stop the counter 28 and a compensating count such as 5,000 is added to the counter to compensate for the additional 180° phase shift automatically introduced by utilizing the second rather than the first zero crossover.

If the start/stop overlap condition should happen to occur for the internally reflected signal, the above technique of introducing an additional 180° phase shift and a compensating count in counter 22 is not possible since the counter 22 has already been loaded with measurements, representing the externally reflected beam path. Accordingly, this internal overlap condition is merely acknowledged with the resultant erroneous measurement not being displayed. Instead, the stop pulse for the frequencies having the overlap condition is automatically shifted 180° by a flip-flop (as will be apparent to those in the art) and the entire distance measurement for all frequencies is redone using the 180° shifted stop pulses for all such measurements.

As has been mentioned before, the phase difference is actually measured for a plurality of measurement intervals on each of several different frequencies with the average for each frequency being used to determine the actual measurement result. In addition, it has been noted that the preferred exemplary embodiment utilizes up and down frequency conversion processes such that the phase measurements are made with a low intermediate frequency signal while the actual modulation on the transmitted and returned laser beams is at a higher RF frequency. However, as those in the art will appreciate, the demodulation process used in the down conversion from RF to IF in detecting and demodulating the return signal, generate harmonics that will cause the IF return signal to be nonsymmetrical. This nonsymmetrical signal then results in a nonlinear error in the resulting distance measurement, the deviation from linearity being a quarter wavelength sine wave as a function of distance. While this nonlinearity is relatively unimportant on the frequencies $F_2$, $F_3$ and $F_4$ were only the higher significant digits of the total distance are being determined, the nonlinearity may introduce significant errors in determining the least significant digits of the total measured distance on frequency $F_1$. Therefore, on frequency $F_1$, the phase measurement for 50 (one-half of the total) measurement intervals is made utilizing an additional one-fourth wavelength of electrical cable in the electrical signal path thus inserting a 90° additional phase shift on these 50 measurement intervals. The subsequent 50 measurement intervals (i.e. the other half) are made without such a phase shift. Therefore, half of the measurements are made with the nonlinear error as it naturally exists and the other half of the measurements are made with the inverse of the nonlinear error. Accordingly, when all of the measurements are averaged together, the nonlinear error is substantially cancelled out of the resultant measurement. The preferred sequence of operation is shown below in tabular form.

| Frequencies | IF Measurement Intervals | Added Electrical Delay or Phase Shift | Transmitted Signal Path | Counter Operations |
|---|---|---|---|---|
| $F_1$ | 50 | 0° | External | Countdown |
|  | 50 | 90° | External | Countdown |
|  | 50 | 0 | Internal | Countup |
|  | 50 | 90° | Internal | Countup |
| $F_4$ | 10 | 0° | External | Countdown |
|  | 10 | 0° | Internal | Countup |
| $F_3$ | 10 | 0° | External | Countdown |
|  | 10 | 0° | Internal | Countup |
| $F_2$ | 10 | 0° | External | Countdown |
|  | 10 | 0° | Internal | Countup |

As previously indicated, an external start/stop pulse overlap causes that one particular external measurement to be remade with a 180° phase shift introduced and with compensating additional count being entered in the counter to compensate for the added 180° phase shift (in the exemplary embodiment where a count of 10,000 corresponds to 360°, the compensating count would be 5,000). Of course, when such an external start/stop overlap condition is detected the remeasurement is made only on that single frequency. However, when an internal start/stop pulse overlap condition occurs, the entire sequence for all frequencies must be rerun with a 180° phase shift being introduced in the transmitted IF signal as determined necessary on the initial run resulting in the detection of the internal overlap condition. Of course, the overlap condition may be detected by noting that the contents of counter 22 is less than some predetermined relatively small contents.

As previously indicated, the phase measurement in the instrument of FIG. 1 is essentially made by initiating counting in counter 22 with the start signal on line 26 derived from the return IF waveform and by continuing to count clock pulses in the counter until the counter is turned off by a stop pulse obtained from the transmitted IF signal. Both the clock pulses and the reference IF pulse are stable signals since they are internally derived in the instrument from crystal oscillator waveforms. However, since the start pulse is obtained from a noisy return waveform, a unique circuit as shown In FIGS. 2, 3 and 4 has been incorporated to improve the stability of the start pulse.

Normally, the return IF signal (in the form of a sine wave) passes through a zero crossing detector to generate a square waveform. This square waveform is then differentiated to generate a potential start pulse at each negative going crossing. However, since the sine wave is inherently amplitude modulated (due to atmospheric turbulence and/or detector shot noise), the pulses generated for excessively low amplitude and excessively high amplitude signals are in error with respect to the stop signals. Accordingly, the additional circuitry shown in FIGS. 2, 3 and 4 passes only those start pulses that are generated by a sine wave that is greater than a minimum present level and less than a maximum present level thus insuring that the resultant accuracy of the start signal is within a predetermined window or limits of error with respect to the stop signal.

The zero cross-detector 40 is shown in FIG. 2 in block form with the sine wave input from the instrument demodulating circuitry representing a return IF signal being shown as waveform 42 input to the zero cross-detector 40. The output waveform 44 from zero cross-detector 40 then represents a potential start pulse provided that the amplitude (and hence the accuracy) of the demodulated input signal is within predetermined limits. Actually, the exemplary system shown in FIG. 2 incorporates two window detectors or comparators 46 and 48 with window detector 46 having relatively narrow predetermined limits as shown diagrammatically at waveform 50 while the window detector 48 has relatively broad predetermined limits as indicated at waveform 52.

The output from one of the window detectors 46 or 48 is selected by selection circuitry at 54 and used to successively set and reset a flip-flop 56. When flip-flop 56 is "set" an output along line 58 therefrom is utilized to enable a one-shot multivibrator 60 whereupon input pulse 44 along line 62 is utilized to trigger the one-shot and produce a start pulse 64 on line 66 provided that the enable signal is present on line 58 corresponding to a set condition of flip-flop 56. As will be explained in more detail below, a window detector 46 or 48 produces no output if the positive half cycle previous to the zero crossover point is less than the lowest predetermined limit. It produces one output pulse if the input amplitude exceeds the lower limit but not the higher limit, and it produces two output pulses if the amplitude exceeds both the low and the high limits as shown at 68, 70 and 72 respectively in FIG. 2.

As shown in FIG. 2, an output from the one-shot multivibrator 60 is passed along line 74 to automatically reset flip-flop 56 and thus disable the one-shot in response to its own output. Accordingly, the normal condition for flip-flop 56 is a reset condition. Thus, if no pulse is received through the window select unit 54 from the window detectors (as in the case of the amplitude being below even the lowest preset limit) then flip-flop 56 will remain in the reset condition and the one-shot 60 will not be enabled and thus no start pulse will appear on line 66. However, if the low predetermined limit is exceeded and the amplitude input is within the window (i.e. the high set limit is not exceeded) then a single pulse will be passed through window select unit 54 to set flip-flop 56 to thus enable the one-shot 60 such that when it is triggered by the subsequent zero crossover detection along line 62, an output start pulse 64 will be produced on line 66 and flip-flop 56 will then be automatically reset via a signal over line 74.

On the other hand, if the amplitude of the just previous positive half cycle of the input wave exceeds both the low and the high set preset limits, two output pulses will be produced as shown at 72, thus causing flip-flop 56 to be first set and then reset prior to the zero crossover point such that by the time the one-shot received a trigger along line 62, the flip-flop 56 has been reset thereby disabling the one-shot and preventing the generation of any actual start pulse along line 66.

As should now be apparent, an actual start pulse on line 66 will be generated only when in response to a negative going zero crossover detection and then only if the preceding half cycle of the input wave is within predetermined amplitude limits. Of course, if the amplitude limits are rather narrow (that is the low and the high limits are rather close together), the resultant accuracy of the start pulse on line 66 will be rather high while if the limits are more broadly spaced, the accuracy will not be so good. However, those in the art will appreciate that the greater or more stringent the accuracy conditions, the less likely they are to be met and thus the longer one must wait for the production of an actual start pulse meeting the extreme accuracy requirements imposed thereon. Accordingly, unless the extreme accuracy is actually required, it is preferable not to impose such stringent conditions. Accordingly, the really stringent conditions imposed by a relatively narrow window detector 46 are utilized only for the lowest or fundamental frequency where high accuracy is necessary because it is used to determine the least significant digits of the total measurement. The less stringent requirements represented by the relatively more broad window detector 48 are utilized for frequencies $F_2$, $F_3$ and $F_4$ where only the more significant digits are being determined and less precision is required for the less exacting measurements.

The window select unit 54 comprises a gating element controlled from the range command module along line 76 to pass signals from narrow window 46 to flip-flop 56 while frequency $F_1$ is being utilized and to pass signals from broad window detector 48 to the flip-flop 56 when frequencies $F_2$, $F_3$ or $F_4$ are being utilized, as should now be apparent.

An exemplary embodiment of this zero crossing detector (shown in block form in FIG. 2) is shown in more detail at FIG. 3. Most of the elements of this diagram should be self-explanatory to those in the art and therefore only a brief description will be explicitly set forth. The input 100 from a demodulator represents a point at which the demodulated return IF signal is input to the zero crossing detector. After gain control, through pot 102, this signal is then amplified in conventional transistor amplifiers comprising transistors 104 and 106. An additional stage of impedance isolation and amplification is obtained by common emitter amplifier 108 which also feeds an input signal to the window detector circuits as shown at 110.

The actual detector for detecting the zero cross-over time comprises a matched pair of transistor amplifiers 112 and 114 fed by a constant current source comprising transistor 116. While the collector of transistor 112 is grounded, the collector of transistor 114 is connected to ground through a tunnel diode 118. Normally, the bases of transistors 112 and 114 are biased such that transistor 112 is essentially cutoff while transistor 114 passes all of the current from constant current source 116 through tunnel diode 118. Then in the positive half cycle preceding a zero crossover point, the base of transistor 112 also passes through a positive half cycle before entering a negative half cycle by experiencing a negative going zero crossover point. (It should be appreciated that the phase of the signal at the output of common emitter amplifier 108 is the same as the phase of the input at 100.) As the base of transistor 112 passes through a point corresponding to the zero crossover point, current begins to flow through transistor 112 thus reducing the current through the tunnel diode 118, causing it to rapidly change from a conducting to a nonconducting state and thereby producing a positive pulse on line 120 connected to the collector or transistor 114. This positive pulse then represents the negative going zero crossover point for the input from the demodulator on the return IF signal. This positive zero crossover signal pulse is then amplified by conventional amplifier stages comprising transistor 122 and a final output common emitter connected amplifier comprising transistor 124 before providing an output potential "start" pulse on line 62 as previously discussed with respect to FIG. 2. The other elements of FIG. 3 should be self-explanatory to those in the art as being for the purposes of providing the necessary biasing and/or operating potentials, and/or other conventional functions as will be apparent.

The narrow and broad window detectors 46 and 48 respectively as well as the window selection gates are shown in more detail in FIG. 4. Here, each of the window detectors actually comprises a conventional integrated circuit comprising comparators for comparing an input signal with at least two preset levels and for producing pulses in response to the input signal exceeding each of these preset levels. In essence, the comparators incorporated in the integrated circuit comprising window detector 46 produce an output pulse at pin 9 whenever the input on terminals 4 and 7 exceed either the lower preset limit represented by a fixed voltage at pin 6 or the higher preset limit represented by a fixed voltage at pin 3. Accordingly, if the input at pins 4 and 7 exceeds neither of these limits, no output pulse will be produced. If the input exceeds only the lower limit at pin 6, a single output pulse will be produced while if the input exceeds both the lower and the upper limits, two output pulses will be produced as previously described. Of course the preset limits utilized with the broad window detector 48 are farther apart but in all other respects the broad window detector 48 is similar to the narrow window detector 46 as should now be apparent. In either case, the outputs from pins 9 are amplified by common emitter amplifiers 150 and 152 respectively before being input to separate AND gates 154 and 156 respectively. The other inputs to these two AND gates comes from the range command module 20 to enable gate 154 (and hence pass the output from the narrow window detector 46) when frequency $F_1$ is being utilized and to enable gate 156 (and hence to pass the output from broad window detector 48) when frequencies $F_2$, $F_3$ and $F_4$ are being utilized. The signals passed by gates 154, 156 are effectively combined in OR gate 158 to set flip-flop 56 as previously described.

Those skilled in the art will readily appreciate that there are many obvious modifications to the disclosed invention that would not appreciably affect the desired improved results described above. Accordingly, all such modifications are intended to be included within the scope of this invention.

What is claimed is:

1. Laser distance measuring apparatus comprising:
   a laser means for providing a transmitted beam of substantially coherent light,
   modulating means for modulating said transmitted beam at a predetermined frequency and for providing a reference electrical signal having a known frequency relationship with said predetermined frequency, detecting means for detecting the modulated information in a reflection of said transmitted beam from a remote target and for providing a return electrical signal in response thereto, said detecting means including:

a zero-cross detector means for detecting when the modulated information in said reflection passes through a zero reference level, window detecting means for detecting when the modulated information in said reflection is within predetermined amplitude limits whereby the accuracy of a detected zero-cross time is determined as being within acceptable limits, and signal generating means effectively connected to both said zero-cross detecting means and to said window detecting means for generating said return electrical signal corresponding to a detected zero-cross time within said acceptable limits, clock means for providing clock pulses at a predetermined clock frequency, gate means operatively connected to said clock means, to said modulating means and to said detecting means for gating said clock in response to said reference and return electrical signals whereby the number of passed clock pulses is a measure of the electrical phase difference between the modulated information on said transmitted beam and its reflection, digital computation means connected to said gate means for counting the number of passed clock pulses and for computing a distance proportional to said phase difference, means for automatically performing a predetermined number of distance measurements, phase shift means connected to said detecting means for providing a predetermined added electrical phase shift to demodulated signals coming from reflection, and means for effectively switching said phase shift means into operation for substantially one-half of the predetermined number of distance measurements whereby nonlinearities in said demodulated signals are effectively cancelled from a resultant measurement representing an average of all of said predetermined number of measurements.

2. Laser distance measuring apparatus as in claim 1 wherein said predetermined added electrical phase shift substantially corresponds to a one-fourth wavelength phase shift.

3. An improvement for use in a laser distance measuring apparatus comprising a modulated laser source, detecting and demodulating means for obtaining a demodulated return signal from a reflected laser beam and computing means for computing distance to a reflecting target based on a measured phase difference between first signals modulated onto the transmitted laser beam and second signals demodulated from the reflected laser beam, said improvement helping to compensate for nonlinearities in the demodulated return signal caused by harmonics introduced in the demodulation process and said improvement comprising:

means for automatically performing a predetermined number of distance measurements, phase shift means connected to said detecting means for providing a predetermined added electrical phase shift to demodulated signals coming from said reflection, and means for effectively switching said phase shift means into operation for substantially one-half of the predetermined number of distance measurements whereby nonlinearities in said demodulated signals are effectively cancelled from a resultant measurement representing an average of all of said predetermined number of measurements.

4. An improvement as in claim 3 wherein said predetermined added electrical phase shift substantially corresponds to a one-fourth wavelength phase shift.

* * * * *

Disclaimer 3,740,141.—*John H. De Witt, Jr.*, Nashville, Tenn. TIMING AND MEASURING METHODS AND MEANS FOR LASER DISTANCE MEASUREMENTS. Patent dated June 19, 1973. Disclaimer filed Oct. 11, 1973, by the assignee, *Laser Systems & Electronics, Inc.*

Hereby enters this disclaimer to claims 1 and 2 of said patent.

[*Official Gazette February 5, 1974*]